Jan. 31, 1956 C. V. McCOMBS 2,732,679
BALE DROPPER
Filed May 8, 1953 2 Sheets-Sheet 1
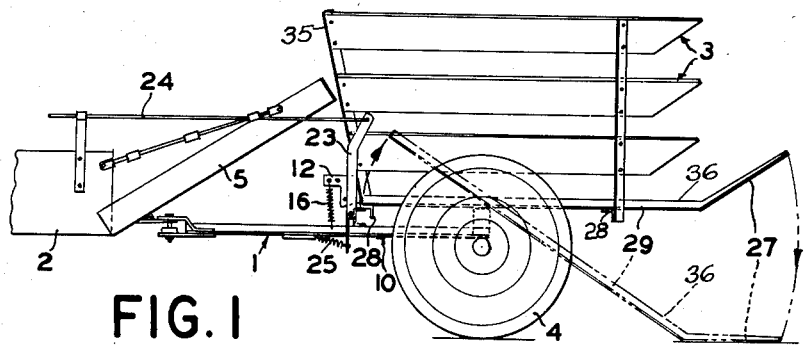
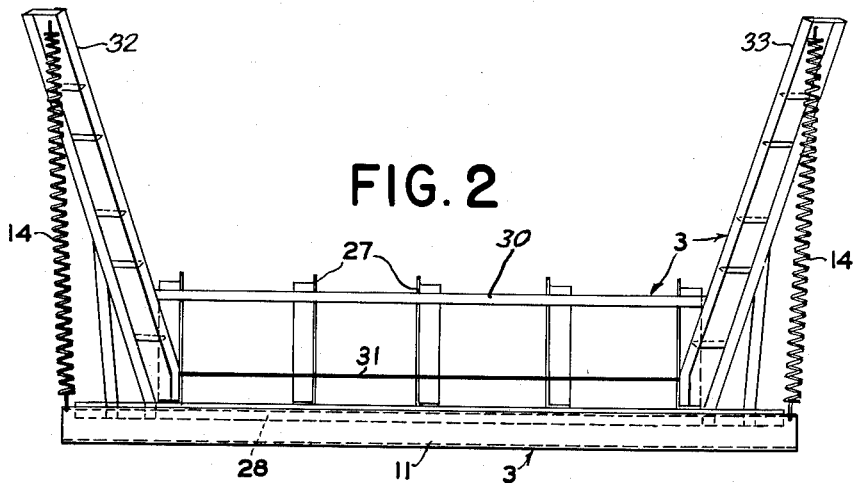
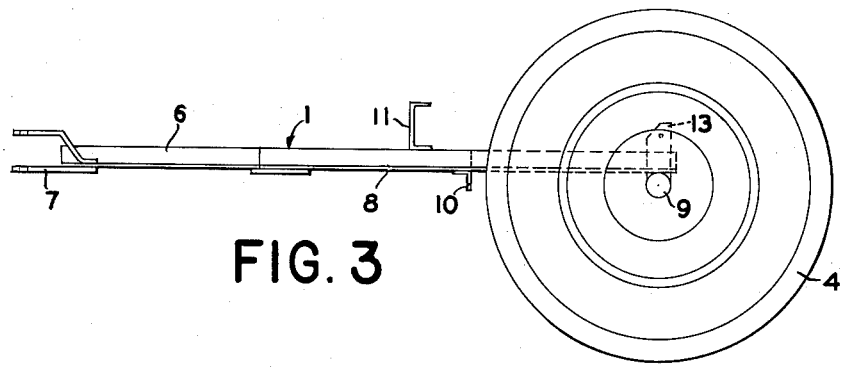
INVENTOR.
CHESTER VERNON McCOMBS
BY
Morrill M. Blackburn
ATTORNEY Jan. 31, 1956

C. V. McCOMBS 2,732,679

BALE DROPPER

Filed May 8, 1953

INVENTOR.
CHESTER VERNON McCOMBS

BY

Merrill M. Blackburn

ATTORNEY

United States Patent Office 2,732,679
Patented Jan. 31, 1956

2,732,679

BALE DROPPER

Chester Vernon McCombs, Sterling, Ill.

Application May 8, 1953, Serial No. 353,785

4 Claims. (Cl. 56—473.5)

The present invention relates to farm machinery and particularly to conveying means for bales of straw or hay delivered by a baling machine. This conveyor is a two-wheeled cart of a definite construction to be hitched behind a baler and to receive a plurality of bales to be conveyed to a designated location and then dropped so that the bales are more or less concentrated in their desired area in the field.

In the drawings annexed hereto and forming a part hereof,

Fig. 1 shows a side view of this conveyor hitched to a baler;

Fig. 2 shows an enlarged front elevation of the basket of the conveyor without running gear;

Fig. 3 shows a comparable enlarged side elevation view of the running gear;

Figure 4:
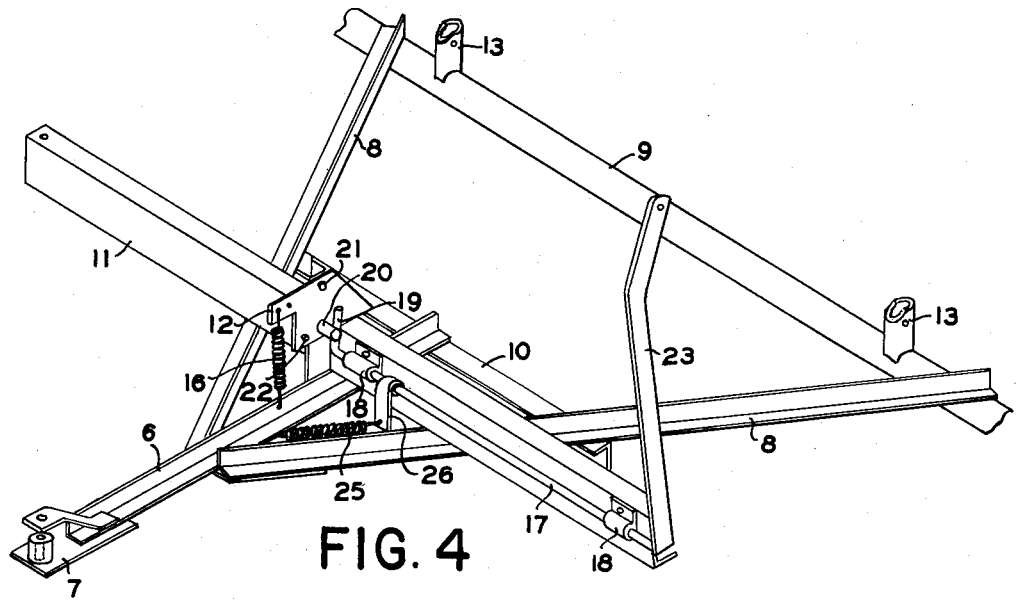
Fig. 4 shows an enlarged perspective view of the frame of this conveyor.

Reference will now be made in greater detail to the annexed drawings for a more complete description of this invention, which comprises a running gear 1 to be hitched to the rear end of a baler 2 and adapted to carry a pivoted basket 3. The running gear 1 has a pair of wheels 4 and a frame including an axle 9 connecting the wheels. In Fig. 4, the axle is shown with the ends broken off.

At the rear end of the baler is an inclined delivery chute 5 which registers with the rear terminal of the baler and delivers the bales from the baler to the conveyor. The running gear comprises a tongue 6 having at its forward end attaching means 7 by which the conveyor may be hitched to the baler, and lateral braces 8 of the frame are connected to the axle 9. A cross-bar 10 helps to steady the frame of the running gear, and the end of the tongue 6 is secured thereto. A cross-bar 11 is secured at the top of the frame and forms a part thereof and supports a latch 12 and associated parts.

Figure 5:
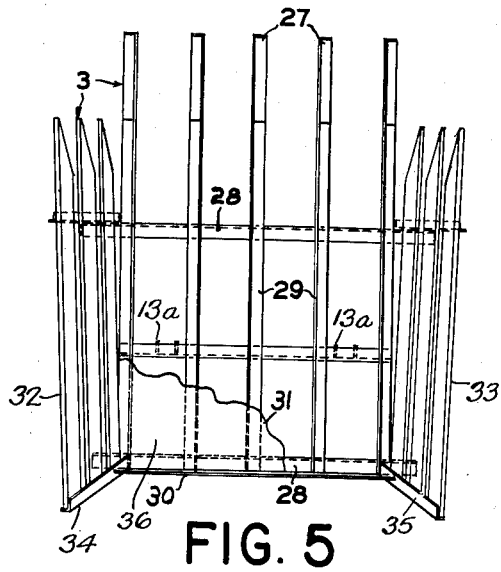
Fig. 5 shows a plan view of the basket detached from the running gear.

The basket 3 of the conveyor is pivotally connected through a pair of brackets 13a (Fig. 5) which depend from the central member of three longitudinally spaced bottom cross-bars 28 of the basket to the upstanding brackets 13 and, as shown in broken lines in Fig. 1, may be tilted backward to unload the bales collected. The basket thus rotates about a generally horizontal axis of pivot, which is perpendicular to the direction of movement of the conveyor, from its loading position to its unloading position. When the operator reaches the place where he wishes to deposit his load, he unlatches the front of the basket and, since there is an excess of weight back of the axle 9, the basket tilts back and allows the bales to slide off of the conveyor. Thus, as illustrated in Figs. 1 and 5, the axis of pivot lies below the middle cross-bar 28 and is longitudinally offset or located forwardly of the center of the length of the basket bottom 36. By this construction, an excess of the basket carrying capacity is distributed on the side of the axis of pivot corresponding to the unloading position. When bales collect over the bottom of the basket, their weight is distributed predominantly on the side of the unloading position, rearwardly of the axis, so that the basket tends to gravitate to the unloading position when loaded. When the basket is unlatched, it gravitates to the unloading position, whether the conveyor is operating uphill, sidehill, or, importantly, downhill, and the bales discharge completely. Then the springs 14 tilt the basket back to normal position again, and it is latched by engagement of the latch 12 over the bar 28, where spring 16 pulls the latch into latching position.

A rod 17 is mounted in brackets 18, secured to the cross-bar 11, and has one end bent up, forming a crank arm 19, to engage a pin 20, mounted in the latch 12. When the pin 20 is pushed by the arm 19, it turns the latch about its pivot 21, releasing the basket 3 to turn, as indicated in Fig. 1. A stop 22 serves to limit the amount of turning which the latch may do. A lever 23 may be actuated to turn the rod 17, secured to the lever 23. This lever 23 may be turned about the axis of the rod 17 by the operator pulling on the flexible member 24. Spring 25, acting on lever 26, turns the rod 17 so that the crank arm 19 is in latched position for the latch 12.

The basket 3 has rearwardly projecting retaining members or arms 27 and cross-bars 28. As shown in Fig. 1, the retaining members 27 extend upwardly and rearwardly or outwardly from the bottom or base 36 of the basket and are adapted to retain the bales in the basket, avoiding accidental discharge due to bumping and so forth, while lying flat on the ground to release the bales when the basket is in its unloading or discharging position. Longitudinal frame members are shown at 29, and to these the cross-bars 28 are welded. The forward cross-bar 28 is engaged by the latch 12 when the basket 3 is turned to normal position. The springs 14 are secured at one end to the cross-bar 11 to pull the basket 3 down at the forward end. A bar 30 prevents the bales from sliding off from the forward end of the conveyor. On the bed of the basket 3 there is a sheet metal plate 31 which serves to reduce the friction of the bales in sliding out of the basket when it is unlatched to tilt backward, as shown in Fig. 1.

Figure 6:
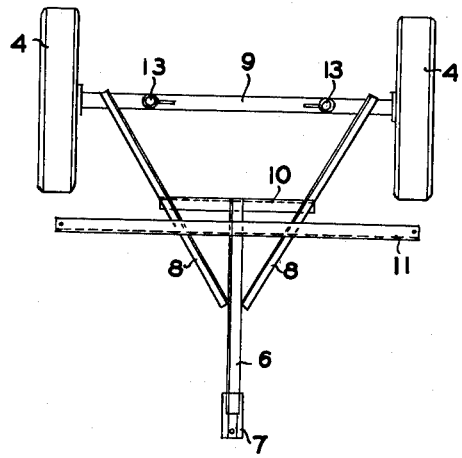
Fig. 6 shows a plan view of the running gear.
Figure 7:
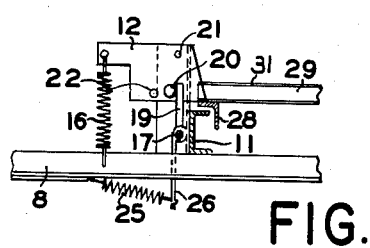
Fig. 7 shows an enlarged fragmentary cross-section of the structure of Fig. 4.

As can be seen on inspection of Fig. 1, the delivery chute 5 and the conveyor are adapted for delivery of the bales, ejected from the rear terminal of the baler 2 into the chute, from the chute directly to the bale-carrying basket 3 of the conveyor at a location normally spaced above the bottom 36 of the basket. In the embodiment shown, the chute 5 extends from the baler 2 rearwardly and upwardly, to terminate at a point normally spaced above the plane of the bed plate 31 at the bottom of the basket, the plate normally being a short distance above the bottom of the rear end of the baler 2. Since the tongue 6 of the running gear 1 is located centrally of the frame and of the basket 3 (see Figs. 4 and 6), the frame and the basket normally ride behind, or directly in back of, the rear terminal of the baler 2 and the chute 5 is normally centrally positioned with respect to the basket, midway between the sides 32 and 33 of the basket.

In the normal or loading position of the basket 3, shown in full lines in Fig. 1, the bales leave the chute 5 and drop to the bottom 36 of the basket or on top of other bales and are contained in the basket for subsequent discharge. In the unloading position of the basket 3, shown in broken lines in Fig. 1, the raised, forward edge of the bottom 36 reaches a position closer to but below the discharge end of the chute 5, so that ejection of a bale into the basket can continue without interference during the unloading operation, the bale traveling down the then inclined bottom and being deposited on the ground with the group of bales unloaded.

Refering to Figs. 2 and 5, the two sides 32 and 33 of the basket 3 extend rearwardly from its forward end and are adapted to contain the bales therebetween, and the sides slope outwardly from the bottom 36 to the top of the basket 3. This construction insures that the bales will enter the basket readily while the assembly is proceeding through a field, during which a considerable amount of bumping and turning is encountered due to which the chute 5 assumes a variety of positions with respect to the basket 3. Also, the sloping sides allow movement of the bales in the basket to form a better stack containing a maximum number of bales.

As shown in Figs. 1 and 5, the forward or leading edges 34 and 35 of the respective sides 32 and 33 of the basket 3 slope forwardly or outwardly from the bottom 36 to the top of the basket, and this construction also aids in insuring the entry of the bales into the basket, particularly when the basket is discharging bales in its unloading position and the edges are pulled away from the chute 5.

It will be noted on reference to Fig. 5 that the distances between corresponding portions of the basket sides 32 and 33 increase from front to rear, that is, the sides diverge rearwardly. Owing to this construction, the bales are able to slide freely from the basket when the basket rotates about the generally horizontal axis of pivot, on disengaging the latch 12 to release the basket therefrom, from its loading position to its unloading position.

It is of course understood that the specific description of structure set forth above may be departed from without departing from the spirit of this invention as disclosed in this specification and as defined by the appended claims.

Having now described my invention, I claim:

1. A bale dropping device for use with a baler comprising a mobile frame having transversely disposed pivot means, a basket having a floor and sides mounted on said pivot means forwardly of its longitudinal center and having latch means releasably connecting a forward portion of said basket to said frame, the said floor having upturned rear end portions and said sides being upwardly and outwardly inclined, and spring means interconnecting said basket and said frame to return said basket to loading position after a load has been dumped therefrom.

2. A bale dropping device for use with a baler comprising a mobile frame having transversely disposed pivot means, a basket having a floor and sides mounted on said pivot means forwardly of its longitudinal center and having latch means releasably connecting a forward portion of said basket to said frame, the said floor having upturned rear end portions and said sides being upwardly and outwardly inclined, said sides also diverging rearwardly and the forward edges of said sides being upwardly and outwardly inclined, and spring means interconnecting said basket and said frame to return said basket to loading position after a load has been dumped therefrom.

3. A bale dropping device for use with a baler comprising a mobile frame including an axle and having transversely disposed pivot means mounted on the axle, a pair of wheels mounted on said axle, a basket having a floor and sides mounted on said pivot means forwardly of its longitudinal center and having latch means releasably connecting a forward portion of said basket to said frame, the said floor having upturned rear end portions and said sides being upwardly and outwardly inclined, and spring means interconnecting said basket and said frame to return said basket to loading position after a load has been dumped therefrom.

4. A bale dropping device for use with a baler comprising a mobile frame including an axle and having transversely disposed pivot means mounted on the axle, a pair of wheels mounted on said axle, a basket having a floor and sides mounted on said pivot means forwardly of its longitudinal center and having latch means releasably connecting a forward portion of said basket to said frame, the said floor having upturned rear end portions and said sides being upwardly and outwardly inclined, said sides also diverging rearwardly and the forward edges of said sides being upwardly and outwardly inclined, and spring means interconnecting a forward portion of said basket and said frame to return said basket to loading position after a load has been dumped therefrom.

References Cited in the file of this patent

UNITED STATES PATENTS

| | | |
|---|---|---|
| 2,037,491 | Wagoner | Apr. 14, 1936 |
| 2,152,644 | Hiser | Apr. 4, 1939 |
| 2,316,435 | James | Apr. 13, 1943 |
| 2,390,306 | Hunziker | Dec. 4, 1945 |

FOREIGN PATENTS

| | | |
|---|---|---|
| 795,110 | France | Dec. 26, 1935 |